Oct. 24, 1967 K. D. DEMAREST 3,348,923
TUBE DESIGN FOR TERRACE WALL FURNACE
Filed Oct. 1, 1965
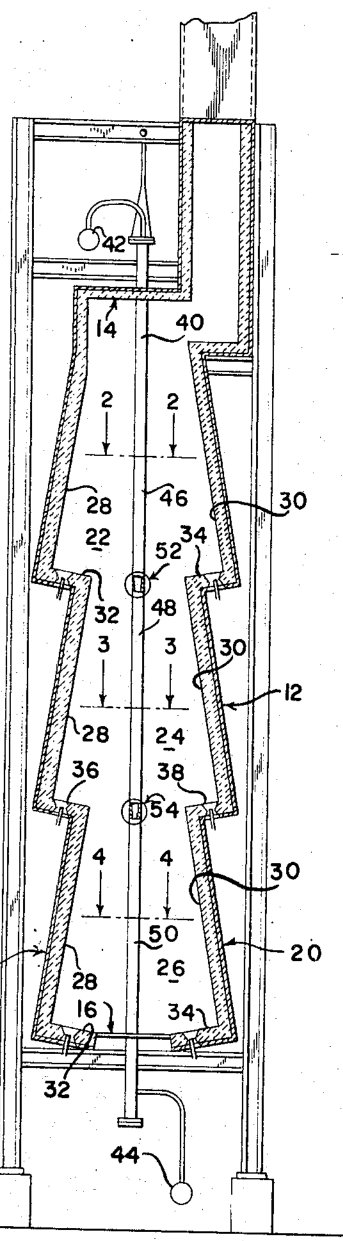
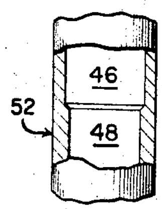
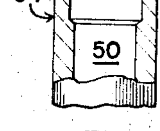
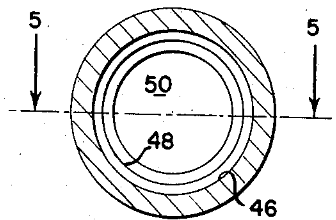
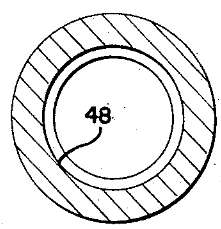
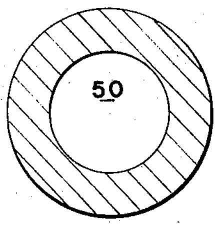
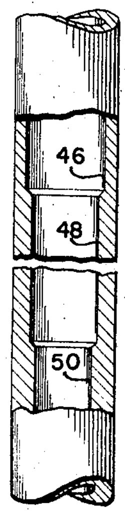
INVENTOR.
KENNETH D. DEMAREST
BY
Richard H. Thomas
ATTORNEY Patented Oct. 24, 1967

United States Patent Office 3,348,923

3,348,923

TUBE DESIGN FOR TERRACE WALL FURNACE

Kenneth D. Demarest, Mendham, N.J., assignor to Foster Wheeler Corporation, New York, N.Y., a corporation of New York Filed Oct. 1, 1965, Ser. No. 491,971
6 Claims. (Cl. 23—288)

ABSTRACT OF THE DISCLOSURE

A reforming furnace comprising walls defining several distinct heating chambers in vertically stacked alignment, a plurality of vertically oriented catalyst filled tubes centered within the furnace, each of the tubes having a uniform outside diameter throughout its length with a greater tube wall thickness adjacent the tube outlet end than adjacent the tube inlet end depending upon tube wall temperature, the decrease in tube inside diameter being approximately proportional to reaction catalyst requirements.

This invention relates to furnaces, having catalyst filled tubes, and more particularly, to an improved tube design in furnaces used in reforming hydrocarbons to produce hydrogen and carbon monoxide mixtures, of the tpye having zone heating control.

In the production of carbon monoxide, carbon dioxide, hydrogen and mixtures thereof, following desulfurization, a natural gas feed is transmitted to a primary reformer where it reacts endothermically with steam over a catalyst, generally nickel base. From the primary reformer, the mixture in some cases goes to a secondary reformer where it reacts with air over a second catalyst.

Since steam reforming of a hydrocarbon was first introduced in the early 1930's, the trend has been to higher and higher operating pressures, which have now attained thirty (30) atmospheres, with the prospect of even higher pressure levels. As a consequence of this pressure increase, the reaction thermodynamics necessitate higher temperature levels as well.

The reaction, which is now conducted, in the production of ammonia synthesis gas, at least at 300 p.s.i. and between temperature levels of about 1000° F. and 1600° F. and higher, and in other reforming reactions at the highest pressures and temperatures possible, occurs as the reacting hydrocarbons and steam flow downwardly in the catalyst filled tubes. These tubes are commonly of high alloy materials to possess sufficient strength at the elevated temperature levels and pressures indicated above. A common basis of design is to employ sufficient metal wall thickness so that the stress (in pounds per square inch) imposed by the pressure of the reactants will not exceed the value of stress which will cause rupture in one-hundred-thousand (100,000) hours of operation.

Although the present trend to higher pressures and temperatures is advantageous in that compression of the smaller volume of gas before reaction is less costly, the disadvantages of increased equipment costs are apparent.

Accordingly, the present invention has, as a primary object, minimized the quantity of high alloy tube metal wall material required, and thus minimized equipment costs. In achieving this object, the invention takes advantage of present furnace configuration and process requirements.

In accordance with the invention, there is provided in combination with a furnace, of the type including wall means having pairs of oppositely disposed refractory faced side walls, which are vertically arranged to define a plurality of stacked heating chambers in upright vertical alignment, which means for controlled separate heating of the furnace chambers, a plurality of closely spaced parallel upright reaction tubes of uniform outside diameter extending through the heating chambers. The tubes each define a series of reaction zones coextensive with the heating chambers. As the reactants are admitted at the upper ends of the tubes, with predetermined heat inputs and resulting temperature increase throughout the reaction zones, the tube metal wall temperatures are highest in the lower zones effecting a reduction in tube metal allowable stress in these zones. To overcome this, the wall thicknesses of the tubes in the lower heating chambers or reaction zones are made greater than the wall thicknesses in the upper chambers, in amounts approximately inversely proportional to the decreases in tube metal allowable stress. Advantageously, the decrease in tube inside volume (the outside diameter remains constant) in the lower reaction zones is found to be approximately proportional to the decrease in reaction catalyst requirements in these zones. As an aspect, the invention takes advantage of the accurate control of heat input and tube metal wall temperatures made possible by the furnace design.

As a further advantage, the use of a constant outside diameter tube permits regular uniform tube arrangements within the furnace avoiding enlargement of the proportions of the furnace enclosure.

The invention and advantages thereof will become more apparent upon consideration of the following specification, and accompanying drawings, in which FIGURE 1 is a section view of a furnace in accordance with the invention;

FIGURE 2 is a section view taken along line 2—2 of FIG. 1;

FIGURE 3 is a section view taken along lines 3—3 of FIG. 1;

FIGURE 4 is a sectional view taken along line 4—4 of FIG. 1;

FIGURE 5 is a partial broken section view of the furnace tube of FIG. 1;

FIGURE 6 is a section view of a portion of a furnace tube of FIG. 1; and

FIGURE 7 is a sectional view of another portion of a furnace tube of FIG. 1.

Referring to the drawings, a reformer furnace 12 comprises a roof 14, a floor 16, and oppositely disposed side walls 18 and 20, the side walls defining vertically stacked heating chambers 22, 24, and 26 from top to bottom. Each heating chamber is defined by pairs of oppositely disposed refractory-faced inclined surfaces 28 and 30, these surfaces in combination making up the sidewalls 18 and 20. The pair of surfaces 28 and 30 may be inwardly inclined as shown, and at the bottom of each of the refractory-faced surfaces, steps 32 and 34 are provided containing suitable burner means 36 and 38, arranged to heat the refractory surfaces uniformly. The uniform flow of radiant heat from the refractory surfaces to upright reaction tubes 40, extending vertically through the heating chambers, achieves a controlled zonal heat input into these tubes. This is described in patent application Serial No. 320,567, filed October 31, 1963, by Frank A. Lee et al., entitled "Terraced Heaters," issued as Patent No. 3,230,052, January 18, 1966. Essentially, the burners 36 and 38 project hot gas streams from elongated troughs upward to sweep the inclined surfaces, the troughs being essentially coextensive with the surfaces so that the surfaces are uniformly heated. The inclination of the walls confines convection streams of gas to the separate heating chambers, and in addition shields a tube section in one heating chamber from heat radiation in another. In this way, each tube section receives a uniform heat influx along the length of the section, but at the same time, a controlled heat influx substantially unaffected by the heat input in adjacent heating chambers. Tests have shown that the refractory surfaces can be uniformly heated to the extent that a temperature variation of less than 2° F. exists over each surface.

In operation, a preferably gaseous hydrocarbon, natural gas or methane, or a hydrocarbon containing one or more carbon atoms in its molecule, is desulfurized and fed, along with steam, into the inlet ends 42 of the tubes 40. The tubes contain a suitable catalyst, such as reduced nickel oxide, nickel-thoria-magnesia, nickel-alumina-magnesia, nickel-magnesia, nickel on carbon, or nickel on alumina. Other suitable catalysts may include cobalt molybdate supported on alumina, a group VIII metal or metal oxide on a suitable support, nickel and iron on a support or carrier, and the like. The substantially reformed gas leaves the catalyst tubes 40 by outlets 44 at the bottom of the furnace.

The nature of the reaction is such that initially the heat input into the gas stream is sensible heat to raise the temperature of the reactants, and ultimately primarily reaction heat. Accordingly, a temperature gradient is established lengthwise in the tubes with reaction proceeding at continuously higher temperature levels from the inlet end to the outlet end until the desired conversion is attained. It is usual to add from 40 to 65% of the total heat influx into the tubes in the upper heaing chamber 22, 25 to 40% in the middle heating chamber 24, and the balance in the lower heating chamber 26, the reaction being conducted between temperature levels of 1000° F. and 1600° F. and higher.

In accordance with the invention, the reaction tubes 40 are divided into reaction zones 46, 48, and 50, coextensive methanol synthesis gas, skin temperature may be as high as 2200° F. As indicated above, a common basis of design is to employ sufficient metal wall thickness so that the stress imposed by the pressure of the reactants (usually above 300 p.s.i. in the ammonia synthesis reaction but lower for the methanol synthesis reaction) will not exceed a stress value which will cause rupture in one-hundred-thousand (100,000) hours of operation.

In this respect, it is customary to calculate the maximum tube skin temperature which will be attained, allowing for maldistribution of heat flux resulting from the tube arrangement employed, to permit transfer of the required heat to the tube walls and to the body of reacting gas. Permissible stress is then determined for a temperature some 50° F. higher to allow for variation from the calculated figures. Tube wall thickness for a given tube diameter can then be determined by usual methods.

The following example will illustrate this aspect of the invention.

*Example I*

As an example of this invention, the reaction, reforming methane to carbon monoxide and hydrogen, occurs between a gas inlet temperature of 1000° F. and a gas outlet temperature of 1538° F., at a design pressure of about 47.5 atmospheres (700 p.s.i.a.). The furnace tubes defining the reaction zone are 4.5 inches in outside diameter and the material used is ASTM A–297, grade HK centrifugally cast steel, 25% chrome, 20% nickel, the material most widely employed for this service.

The following table gives tube dimensions and stress data for the unit.

TABLE I.—TUBE DATA

| | Calculated Peak Tube-Skin Temp., ° F. | Design Tube-Skin Temp., ° F. | Allowable Metal Stress Rupture in 100,000 Hours p.s.i. | Tube I.D., inches | Wall Thickness, inches | Ratio of Wall Thickness | Ratio of Lower to Higher Temperature Allowable Stress |
|---|---|---|---|---|---|---|---|
| Zone 1 | 1,500 | 1,550 | 3,200 | 3.5 | 0.50 | | |
| Zone 2 | 1,630 | 1,680 | 1,960 | 3.0 | 0.75 | .75/.50=1.5 | 3,200/1,960=1.6. |
| Zone 3 | 1,700 | 1,750 | 1,450 | 2.5 | 1.00 | 1.00/.75=1.35 | 1,960/1,450=1.35. |

with the heating chambers 22, 24, and 26. Between each of the reaction zones, junctions 52 and 54 effect an increase in wall thickness and a corresponding reduction in inside diameter of the tube, from the higher reaction zone to the lower reaction zone. The outside diameter of the reaction tube 40 is uniform throughout the entire length of the furnace, whereas the inside diameters are uniform only in the reaction zones.

It was shown above that the heat input into each reaction zone is substantially uniform along the length of the zone by virtue of the furnace design.

The reaction tubes are commonly of a high alloy material to possess sufficient strength at elevated skin temperature levels usually above 1500° F. In the preparation of As shown in the table, as design tube metal temperature increases (the tube metal design temperature is 50° F. above calculated peak tubeskin temperature), the tube wall allowable metal stress decreases. The tube wall thickness is correspondingly increased, the increase from one reaction zone to the next being substantially proportional to the decrease in the tube metal allowable stress, as shown in columns six and seven.

It is a concept of the invention that the decrease or constriction in tube inside diameter (column four) is correlated closely with process requirements.

In the primary reforming reaction, it is desired to reform about 70% of the methane. The reaction conditions required to achieve this conversion are as follows:

TABLE II.—PROCESS DATA

| | Methane Content at End of Zone-Volume Dry Basis, percent | Percent Catalyst in Place, percent | Heat Input B.t.u./sq. ft./hr. | Tube I.D., inches | Heat Transfer Surface, square inches | Percent Heat Transfer Surface of Unit | Percent Heat, Input-Heat, Input X Percent Transfer Surface | Gas Temp., ° F. | Comparative Space Vel. Theo. $H_2$, s.c.f.h./cu. ft. of Catalyst—Methane Reaction Rate, mols/cu. ft./hr. |
|---|---|---|---|---|---|---|---|---|---|
| Inlet | | | | | | | | 1,000 | |
| Zone 1 | 29 | 48 | 21,800 | 3.5 | 11.0 | 39 | 43 | 1,235 | 3,950/2.6 |
| Zone 2 | 14 | 30 | 19,900 | 3.0 | 9.0 | 33 | 33 | 1,410 | 3,740/2.4 |
| Zone 3 | 9 | 22 | 17,200 | 2.5 | 7.9 | 28 | 24 | 1,538 | 2,580/1.7 |

The numbers in the first column of Table II are a measure of how much reaction has occurred, or the degree of conversion, and are in terms of volume dry basis methane content remaining at the end of the reaction zone. The reduced inside diameters of column four result obviously in reduced catalyst volume, or percent of catalyst in place (column two). It has already been mentioned that a temperature gradient is established with the reaction proceeding at continuously higher temperatures (column eight). Temperature dependence of catalyst activity is well known, activity increasing with temperature level. The proportionally smaller quantity of catalyst (column two) at higher temperature levels, as compared with lower temperature levels, represents an optimum catalyst distribution, and incidental with this, achieves a minimum in catalyst costs.

Referring to Table II, the heat inputs in the different chambers of the terraced wall furnace provide the heat flux rates of column three, in B.t.u./sq. ft./hr. Multiplying heat input by percent heat transfer surface (column six), the percentages of heat input (column seven) are obtained for the heating chambers 22–26. These heat inputs achieve the gas temperatures given in column eight and tube metal wall peak temperatures of Table I.

As with catalyst colume, for the percent conversion of column one, the percents heat input of column seven and gas temperatures of column eight are realistic or representative process requirements for this reaction and within well known limits. Column nine contains numbers for space velocity and reaction rate, in this example, which values are dependent in part on tube inside diameter. Again these numbers are within realistic process limits to achieve the degree of conversion of column one.

Towards achieving this close correlation between process requirements and tube diameter, the use of the terraced wall furnace, or a furnace of similar design capable of controlled zonal heat input, is critical. The terraced wall configuration and burner locations permit closely controlling the heat fluxes to the different vertical tube sections to maintain tubeskin temperatures lengthwise of the sections within carefully chosen limits dictated by the process requirements. This in turn permits accurately increasing tube wall thicknesses, where needed, by reduction of tube inside diameter, and the result of the reductions of tube inside diameter, reduced catalyst amounts, can be closely correlated with process requirements. In a furnace without the capability of zonal heat input, greater latitude would be necessary in dimensioning the tube walls with a corresponding increased difficulty in obtaining a correlation between catalyst amounts and process requirements.

In addition, the use of a constant outside diameter tube permits regular uniform tube arrangements in the furnace and avoids the need for increasing the proportions of the fire box enclosure. In other words, if tube wall thickness were increased in a furnace, with increased outside diameter, or varying outside diameter, fire box enclosure dimensions would also have to be increased.

Centrifugally cast tubes are normally composed of sections up to 8 to 10 feet in length welded together to form a tube of the desired length in one piece. Thus varying inside diameter sections for a given O.D. can easily be accomplished by present fabrication methods. If an extruded or other rod tube should be used, a tapering inside diameter could be employed rather than one varying in successive stages.

Although the invention has been described with respect to a single embodiment, variations and other advantages will be apparent to those skilled in the art and within the spirit and scope of the invention as claimed. For instance, the example is for a furnace in which the tubes are in a single row. The invention may have even greater use in a double row furnace in which, because of non-uniform tube heating, and heat influx, the tubes will have higher skin temperatures than in the single row furnace example.

Also, although it is conventional to use down-flow in the reaction tubes, and the example of the invention is so directed, the heater can be arranged for up-flow of the reactants. The principles of the invention would still be applicable.

What is claimed is:

1. A primary reformer for use in the production of hydrogen and carbon monoxide mixtures comprising a housing including opposite vertically oriented side walls each side wall defining at least two refractory faced planar surfaces one above the other;

inwardly oriented step means between the planar surfaces;

opposite planar surfaces being substantially coextensive with each other in a vertical direction so that the side walls and step means define at least two distinct heating chambers one above the other;

individually controlled heating means for each of said heating chambers;

a plurality of closely spaced parallel upright catalyst filled reaction tubes within said housing approximately midway between said side walls;

each of said tubes having a uniform outside diameter lengthwise thereof and opposed inlet and outlet ends;

said tubes also having a change in wall thickness along their lengths occurring substantially at the plane of said step means so that each tube defines at least two reaction zones one above the other, each reaction zone being substantially coextensive with a heating chamber;

the tube wall thickness being substantially uniform in each reaction zone, and greater in a reaction zone adjacent a tube outlet end than in a reaction zone adjacent a tube inlet end.

2. A primary reformer according to claim 1 wherein the planar surfaces are inwardly inclined to define a plurality of stacked trapezoidal chambers, the walls in one chamber shielding the reaction zones in another chamber from radiation in said one chamber achieving accurate and controlled temperature levels in the reaction zones.

3. A primary reformer according to claim 1 including three heating chambers and reaction zones coextensive therewith, the ratio of tube wall thickness as of the upper reaction zone to the middle reaction zone being approximately 1:5, and of the middle reaction zone to the lower reaction zone being approximately 1:35.

4. A primary reformer according to claim 1 wherein the tubes are aligned in at least one row through the reformer furnace intermediate the pairs of oppositely disposed side walls, the oppositely disposed walls defining in cross-section substantially rectangular heating chambers.

5. A primary reformer for use in the production of hydrogen and hydrogen and carbon monoxide mixtures comprising a housing including opposite vertically oriented side walls each side wall defining at least two refractory faced planar surfaces one above the other;

inwardly oriented step means between the planar surfaces;

opposite planar surfaces being substantially coextensive with each other in a vertical direction so that the side walls and step means define at least two separate heating chambers one above the other;

individually controlled heating means for each of said heating chambers;

a plurality of closely spaced parallel upright catalyst filled reaction tubes within said housing approximately midway between said side walls;

each of said tubes having a uniform outside diameter lengthwise thereof and an upper inlet end and a lower outlet end;

each tube also having a change in wall thickness along its length occurring substantially at the plane of said step means so that each tube defines at least two reaction zones one above the other, each reaction zone being substantially coextensive with a heating chamber;

the tube wall thickness being substantially uniform in each reaction zone, and greater in the reaction zone adjacent the tube lower outlet end than in the reaction zone adjacent the tube upper inlet end.

6. A primary reformer according to claim 5 wherein the temperature of the mixture in the reaction zones of each tube varies from about 1000° F. to an outlet temperature more than about 1500° F. and the miximum tube wall temperature varies from at least about 1500° F.

to a temperature respectively higher, the ratio of tube wall thicknesses in the reaction zones being approximately inversely proportional to the decrease in tube metal allowable stress resulting from the increase in tube wall temperature;

the decrease in tube inside diameter being approximately proportional to reaction catalyst requirements.

References Cited

UNITED STATES PATENTS

| | | | |
|---|---|---|---|
| 2,487,324 | 11/1949 | Forseth | 196—110 X |
| 3,195,989 | 7/1965 | Pyzel | 23—277 X |

JAMES H. TAYMAN, Jr., *Primary Examiner.*

UNITED STATES PATENT OFFICE

CERTIFICATE OF CORRECTION

Patent No. 3,348,923 October 24, 1967

Kenneth D. Demarest

It is hereby certified that error appears in the above numbered patent requiring correction and that the said Letters Patent should read as corrected below.

Column 1, line 28, for "tpye" read -- type --; line 50, for "materials" read -- material --; lines 62 and 63, for "minimized", each occurrence, read -- minimizing --; column 2, line 34, for "lines" read -- line --; line 42, for "sectional" read -- section --; column 5, line 25, for "colume" read -- volume --; line 27, for "or" read -- of --; line 64, for "rod" read -- wrought --; column 6, line 48, for "1:5" read -- 1.5 --; line 49, for "1:35" read -- 1.35 --; column 8, line 3, for "decrease in" read -- ratio of --.

Signed and sealed this 28th day of January 1969.

(SEAL)

Attest:

Edward M. Fletcher, Jr.

Attesting Officer

EDWARD J. BRENNER

Commissioner of Patents